United States Patent [19]

Yamaguchi

[11] Patent Number: 4,849,954
[45] Date of Patent: Jul. 18, 1989

[54] DISC ATTITUDE VARIATION DETECTING APPARATUS

[75] Inventor: Hirohisa Yamaguchi, Tokyo, Japan

[73] Assignee: TEAC Corporation, Tokyo, Japan

[21] Appl. No.: 101,145

[22] Filed: Sep. 25, 1987

[30] Foreign Application Priority Data

Sep. 26, 1986 [JP] Japan ................ 61-227880

[51] Int. Cl.$^4$ ............................................. G11B 7/095
[52] U.S. Cl. .................................. 369/50; 369/118
[58] Field of Search ............... 369/50, 44, 46, 45, 369/112, 118; 250/201 DF

[56] References Cited

U.S. PATENT DOCUMENTS

| | | | |
|---|---|---|---|
| 4,253,723 | 3/1981 | Kojima et al. | 369/46 |
| 4,486,791 | 12/1984 | Wada et al. | 369/45 |
| 4,607,357 | 8/1986 | Okano | 369/44 |
| 4,636,628 | 1/1987 | Tsukai | 369/46 |
| 4,661,943 | 4/1987 | Ikeda | 369/46 |
| 4,674,078 | 6/1987 | Otsuka et al. | 369/44 |

FOREIGN PATENT DOCUMENTS

| | | | |
|---|---|---|---|
| 3502138 | 7/1985 | Fed. Rep. of Germany | 369/44 |
| 61-246938 | 4/1986 | Japan | 369/44 |
| 2143344 | 2/1985 | United Kingdom | 369/46 |
| 2156069 | 10/1985 | United Kingdom | 369/44 |

*Primary Examiner*—Donald McElheny, Jr.
*Attorney, Agent, or Firm*—Michael N. Meller

[57] ABSTRACT

A disc variation detecting apparatus comprises a light-sensitive element which faces the disc and is positioned together with a light-emitting element in a tangential direction of tracks on the disc. In this configuration, the following relationship is satisfied; $d/L \leq \beta/\alpha$, where d is a width of a spot of the light beam in its displacement direction formed on the light-sensitive element, L is a length of the light-sensitive element in the displacement direction, $\alpha$ is an angular variation of the disc corrsponding to the length L, and $\beta$ is an allowable error angle range upon attitude control of a pickup.

14 Claims, 6 Drawing Sheets

FIG.9
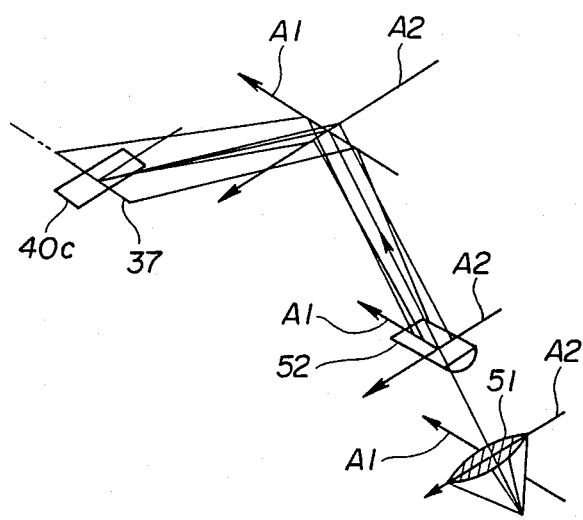
FIG.10
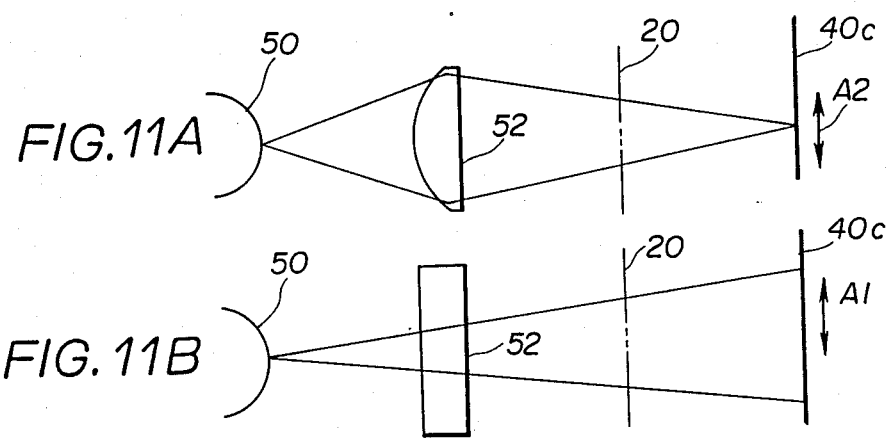
FIG.11A
FIG.11B
FIG.12
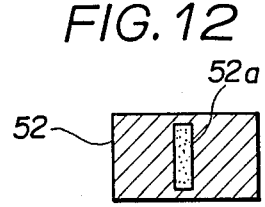

DISC ATTITUDE VARIATION DETECTING APPARATUS

BACKGROUND OF THE INVENTION

The present invention generally relates to a disc variation detecting apparatus, and in particular to a disc variation detecting apparatus for detecting variations in an inclination or a position in an axial direction of an information recording disc upon recording or reproduction.

An optical disc is well known as an information recording disc. The optical disc is widely used as an information recording means of a high information recording density. However, the optical disc has difficulty in permanently maintaining its flat plane. In general, the relative height relationship between center and outer periphery parts of the disc varies, and the disc is thus distorted in the form of a dish. In particular, an optical disc with an air sandwiched type configuration is liable to have the inclination occurring at disc planes in inner and outer periphery parts having a spacer.

When recording information on a distorted disc, a spot of a light beam is deformed on an information recording surface of the disc, because the light beam cannot be perpendicularly projected thereon due to distortion of the disc. Therefore, there is the possibility that distorted pits are formed on the information recording surface and some pits are lacking. Deformation of the pits causes degradation of the frequency characteristic upon reproduction. The occurrence of inclination at the inner periphery part of the disc is a particularly serious problem where the disc is rotated so that an angular velocity of the disc is constant. On the other hand, upon reproduction, a beam of light which is emitted by a head or pickup and is reflected on the disc surface, does not return to the pickup accurately, so the reproduction of the recorded information is degraded.

In order to resolve the above problems, a disc inclination detecting apparatus has been proposed in the Japanese Pat. Laid-Open Publication No. 236,130/1985, for example. This apparatus has a pair of a light-emitting element and a light-sensitive element which are located in the radial direction of the disc. A light beam emitted by the light-emitting element is reflected on the surface of the disc. A reflected light beam reaches the light-sensitive element, and moves on a light-sensitive surface of the light-sensitive element in a direction parallel to the axis of the disc, corresponding to the inclination of the disc. Then, the pickup is attitude-controlled by an attitude-controlling servo system by the positional displacement of the reflected light beam on the light-sensitive surface.

Another disc inclination detecting apparatus is also known. This conventional apparatus includes a light-emitting element and two light-sensitive elements. These elements are arranged in the radial direction of the disc. The light-emitting element emits each of two light beams towards the inner and outer periphery of the disc. The light beams are each reflected by the disc and received by the corresponding light-sensitive elements. Then, the voltage difference between the outputs of the light-sensitive elements is amplified by a differential amplifier. The amplified difference voltage varies with the inclination of the disc.

However, the former prior disc inclination detecting apparatus aforementioned has the following disadvantage. The reflected light beam moves on the light-sensitive surface in the direction parallel to the axis of the disc, even when the disc itself moves in the axial direction and correspondingly the distance between the surface of the disc and a pair of the light-emitting element and the light-sensitive element is varied. Therefore, the apparatus detects the movement of the disc in the axial direction as if the disc is inclined. It should be noted that this movement of the disc does not substantially affect the recording or reproducing operation.

The latter conventional disc inclination detecting apparatus has the following disadvantages, when applied to a write-once type optical disc. With this type of disc, the reflectivity of the light beam at a recorded part on which an information signal has been recorded is different from the reflectivity at an unrecorded part on which an information signal has not yet been recorded. When the recorded part of the recording surface is positioned inside a position on the recording surface which corresponds to the position of the light-emitting element, and when the unrecorded part is positioned outside that position on the recording surface, the difference voltage indicating the inclination of the disc is outputted even if the disc has no inclination, that is, the disc is kept horizontal.

In order to overcome the problems especially in the former prior disc inclination detecting apparatus, a novel and useful disc inclination detecting apparatus was just previously proposed in a U.S. patent application Ser. No. 094,113 filed on Sept. 8, 1987, U.S. Pat. No. 4,805,164, and entitled "DISC INCLINATION DETECTING APPARATUS", the assignee of which is the same as the present application. This proposed disc inclination detecting apparatus may not be totally eliminate the problems in the latter conventional apparatus.

SUMMARY OF THE INVENTION

Accordingly, a general object of the present invention is to provide a novel and useful disc variation detecting apparatus, in which the above described problem has been eliminated.

A more specific object of the present invention is to provide a disc variation detecting apparatus in which variations in an inclination of a disc can be detected without being affected by a positional displacement in an axial direction of the disc.

Another object of the present invention is to provide a disc variation detecting apparatus in which variations in an inclination of the disc can be detected without being affected by a difference in the reflectivity on a recording surface of a write-once type optical disc.

Still another object of the present invention is to provide a disc variation detecting apparatus in which a positional displacement in an axial direction of a disc can be detected without being affected by an inclination of the disc.

To attain the above objects and features, according to the present invention, there is provided a disc variation detecting apparatus comprising a light-emitting element for projecting a light beam on the disc; a light-sensitive element for receiving the light beam reflected by the disc and outputting a corresponding electric signal, the light-sensitive element facing the disc and being positioned together with the light-emitting element in a tangential direction of tracks on the disc. The apparatus further comprises a signal processing circuit for detecting, on the basis of the electric signal, a positional displacement of the light beam on the light-sensitive element. In this configuration, the following relationship is satisfied: $d/L \leq \beta/\alpha$, where d is a width of a spot of the light beam in its displacement direction on the light-sensitive element, L is a length of the light-sensitive element in the displacement direction, $\alpha$ is an angular variation of the disc corresponding to the length L, and $\beta$ is an allowable error angle range upon attitude control of a pickup.

Other objects and further features of the present invention will be apparent from the following detailed description when read in conjunction with the attached drawings.

BRIEF DESCRIPTION OF THE DRAWINGS

FIGS. 8 and 9 are respectively side and perspective views of a second embodiment according to the present invention, which is designed so as to detect an inclination of a disc;

FIG. 10 is a perspective view of a cylindrical lens used in the second embodiment shown in FIGS. 8 and 9;

FIGS. 11A, 11B and 12 are views for explaining a function of the cylindrical lens illustrated in FIG. 10.

DETAILED DESCRIPTION

A description will first be given of a conventional disc inclination detecting apparatus with reference to FIG. 1.

Figure 1A:
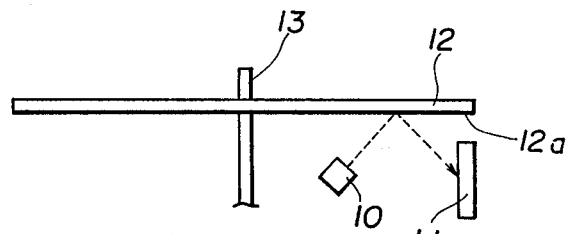
FIG. 1A is a side view of a conventional disc inclination detecting apparatus.

FIGS. 1A shows the disc inclination detecting apparatus disclosed in the publication aforementioned. A pair of a light-emitting element 10 and a light-sensitive element 11 is positioned in the radial direction of a disc 12, which is fixed to a rotation shaft 13 driven by a motor (not shown). A light beam is projected onto an information recording surface 12a of the disc 12 and is reflected thereon. A reflected light beam reaches the light-sensitive element 11. The reflected light beam moves on a light-sensitive surface of the light-sensitive element 11 in the perpendicular or axial direction, corresponding to the inclination of the disc 12.

In this configuration, when the disc 12 itself moves slightly upwards along the axis during rotating, the reflected light beam correspondingly moves upwards on the light-sensitive surface. That is, the conventional configuration detects the displacement of the disc in the axial direction as if the disc is inclined or distorted. The displacement of the disc itself in the axial direction does not affect the reproducing operation, because a pickup or head (not shown) for reproduction projects the light beam perpendicularly on the information recording surface and receives the light beam reflected thereon.

Figure 1B:
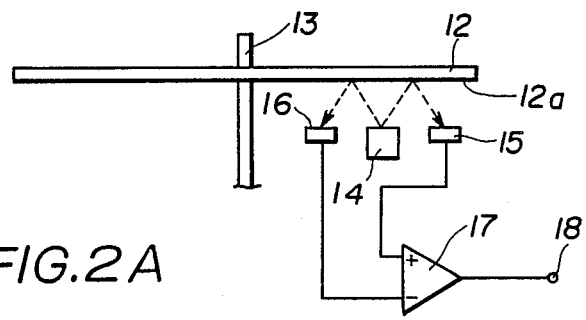
FIG. 1B is a side view of another conventional disc inclination detecting apparatus.

FIG. 1B illustrates another conventional disc inclination detecting apparatus. A light-emitting element 14 and light-sensitive elements 15 and 16 are aligned in the radial direction of the disc 12. The light-emitting element 14 emits two independent light beams towards the disc 12. The light-sensitive elements 15 and 16 receive the corresponding light beams reflected by the disc 12. The outputs of the light-sensitive elements 15 and 16 are delivered to a differential amplifier 17, which outputs a voltage difference therebetween to an output terminal 18. The voltage difference at the output terminal 18 is sent to the attitude-controlling servo system (not shown).

The conventional disc inclination detecting apparatus FIG. 1B has the folowing disadvantages, when applied to a write-once type optical disc. The reflectivity of the light beam at a recorded part on the recording surface 12a on which an information signal has been recorded is different from the reflectivity at an unrecorded part on the recording surface 12a on which an information signal has not yet been recorded. When the recorded part of the recording surface 12a is positioned inside a position on the recording surface which corresponds to the position of the light-emitting element 14, and the unrecorded part is positioned outside that position on the disc, the voltage difference indicating the inclination of the disc 12 is outputted even when the disc 12 has no inclination, that is, the disc 12 is in the horizontal direction.

Therefore, the present invention is intended for detecting variations in an inclination of a disc without being affected by displacement of the disc in the axial direction.

A description will now be given of a first embodiment of a disc variation detecting apparatus according to the present invention, which is designed so as to detect an inclination of a disc.

Figure 2A:
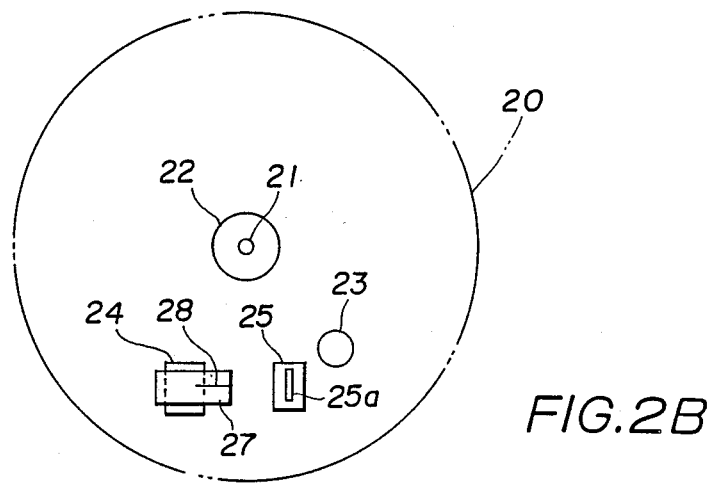
FIGS. 2A and 2B are respectively a plan view and a side view of a first embodiment of a disc variation detecting apparatus according to the present invention, which is designed so as to detect an inclination of a disc.
Figure 2B:
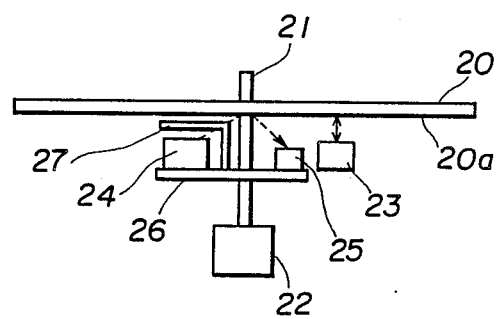
Figure 3:
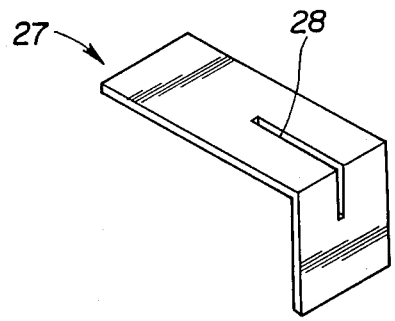
FIG. 3 is a perspective view of a slit plate used in the first embodiment shown in FIGS. 2A and 2B.

Referring to FIGS. 2A and 2B, an optical disc 20 is fixed to a rotation shaft 21, to one extreme end of which is attached a motor 22. The motor 22 drives the shaft 21 so that the disc 20 can be rotated at a constant speed of the rotation. The disc 20 has an information recording surface 20a formed on its lower surface. A pickup or head 23, which faces the information recording surface 20a, projects a light beam thereon in the axial direction and receives a reflected light beam. The pickup 23 is attitude-controlled by an attitude controlling servo system (not shown) in accordance with an error voltage $V_{ER}$ which the present invention outputs, as will be described later.

A pair of a light-emitting element 24 and a light-sensitive element 25 is mounted on a substrate 26 so as to be aligned in a tangential direction of tracks formed on the information recording surface 20a. In the arrangement illustrated in FIG. 2A, the pair of the light-emitting element 24 and the light-sensitive element 25 is located in a tangential direction of tracks in an intermediate peripheral region of the information recording surface 20a. Of course, it is also possible to arrange them in a tangential direction of tracks in an inner periphery region or an outer periphery region. A slit plate 27 is provided between the light-emitting element 24 and the disc 20. The slit plate 27 has substantially an L-shape and a slit 28 formed at a corner part thereof. One edge of the slit plate 27 is mounted on the substrate 26 so that slit 28 is oriented in the tangential direction. In addition, it is preferable to position the slit plate 27 so that the slit 28 is close to the information recording surface 20a in order to obtain a fine and long light beam. The slit plate 27 is used when a light-emitting diode is employed as the light-emitting element 24. The light beam emitted by the light-emitting diode is formed into a fine and long light beam extending in the tangential direction by the function of the slit 28 and is then projected onto the information recording surface 20a. The light beam reflected on the information recording surface 20a is received by the light-sensitive element 25.

Figure 4A:
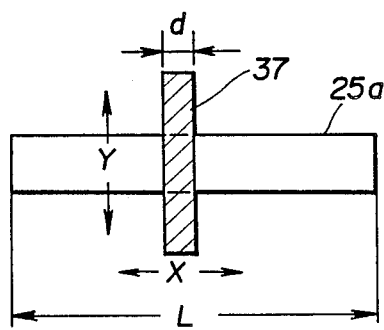
FIGS. 4A and 4B are views for explaining a condition regarding the width d of a light beam in the apparatus in FIGS. 2A and 2B, respectively.
Figure 5:
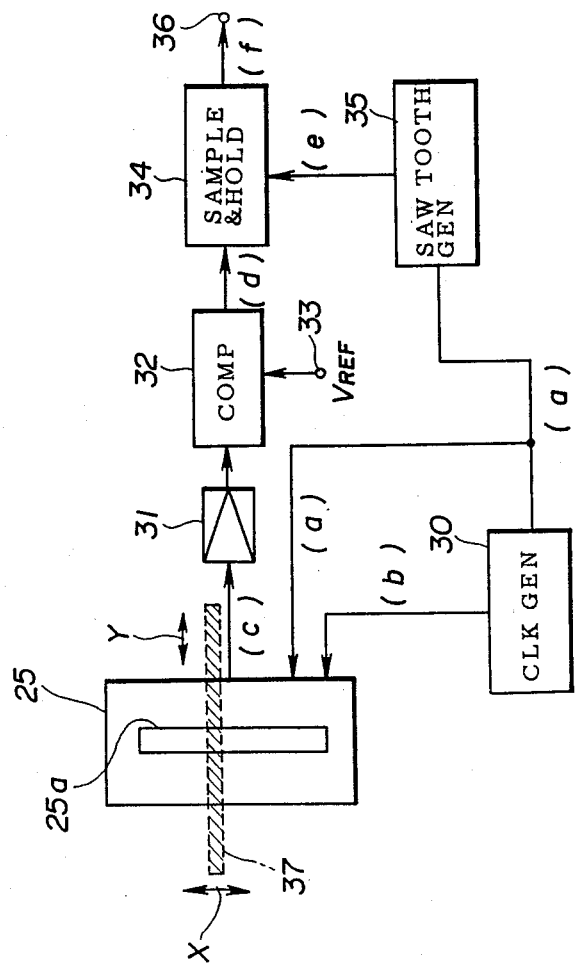
FIG. 5 is a block diagram of a signal processing circuit used in the present invention.

The light-sensitive element 25 may be formed by a one-dimensional charge-coupled device having a light-sensitive surface 25a of a long and narrow shape. The light-sensitive element 25 is positioned so as to be perpendicular to the longitudinal direction of the slit 28. Therefore, a narrow and long beam spot 37 (which is shown in FIGS. 4A or 5) projected onto the light-sensitive surface 25a moves thereon in the longitudinal direction of an arrow X in accordance with the inclination of the disc 20. Also, when the disc 20 itself moves in the axial direction and therefore the distance between the disc 20 and the pair of the light-emitting element 24 and the light-sensitive element 25 is varied, the beam spot 37 on the light-sensitive surface 25a moves thereon in the width direction of an arrow Y shown in FIGS. 4A or 5. However, it should be noted that in the this case, the light-sensitive surface 25a does not detect this displacement of the beam spot 37 in the direction of the arrow Y, because the length of the beam spot 37 extending in the width direction of the light-sensitive surface 25a is sufficiently longer than the width of the light-sensitive surface 25a, and the position on which the light beam is irradiated remains constant on the light-sensitive surface 25a.

Figure 4B:
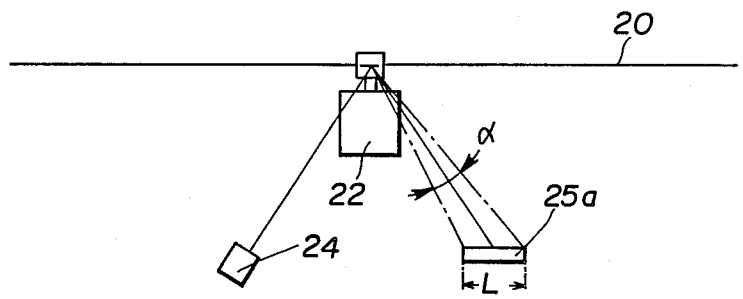

A description will be given of a condition regarding the width of the light beam, by referring to FIGS. 4A and 4B.

As shown in FIG. 4A, it is assumed that the length of the light-sensitive surface 25a in the direction of an arrow X is denoted by L, and the width of the beam spot 37 indicated by hatchings in the direction of the arrow X is represented by d. Further, as shown in FIG. 4B, it is assumed that angular variation in the reflection angle corresponding to the length L of the light-sensitive surface 25a is represented by $\alpha$, and an allowable angle error range in the attitude-controlling system is denoted by $\beta$. By use of these parameters, the width d of the light beam irradiated on the disc 20 is determined so as to satisfy the following relatioship:

$$d/L \leqq \beta/\alpha$$

If the light beam is reflected on a boundary of a recorded part and an unrecorded part of the information recording surface 20a, the distribution of light intensity in the beam spot 37 may not be uniform. For example, there is the possibility that the light intensity in the right side half of the beam spot 37 in FIG. 4A is stronger than a light intensity in the left side half thereof. As will be described later, a position of the light beam on the light-sensitive surface 25a is detected by comparing an amplified output level of the light-sensitive element 25 with a reference level $V_{REF}$. In the above example, if the light intensity of the left side part of the beam spot 37 is weak, the corresponding amplified output level of the ligth-sensitive element 25 may be smaller than the reference level $V_{REF}$. In this case, there is the possibility that the actual position of the beam spot 37 on the light-sensitive element 25 is different from the detected position of the beam spot. This means that the detected inclination of the disc 20 which corresponds to the detected position of the beam spot 37 includes an error. However, when the width d of the beam spot 37 satisfies the above relationship, the error included in the detected inclination is within the allowable angle error range of the attitude-controlling servo system. Therefore, even if the light beam emitted by the light-emitting element 24 is reflected on the boundary of the recorded part and the unrecorded part of the information recording surface 20a, the attitude-control can be accurately performed.

Figure 6:
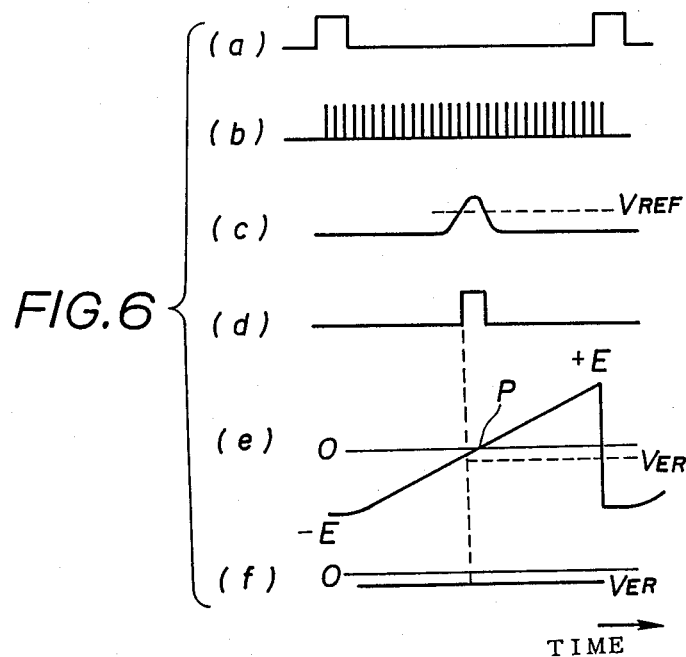
FIG. 6 shows waveforms of signals at parts of the block diagram shown in FIG. 5.

FIG. 5 is a block diagram of a signal processing circuit for processing a signal from the light-sensitive element 25 and producing an error voltage $V_{ER}$ representing an inclination angle of the disc 20. A clock generator 30 generates reference pulses shown in FIG. 6(a) as well as transfer pulses shown in FIG. 6(b). The pulse separation between adjacent two reference pulses corresponds to the length of the light-sensitive surface 25a of the one-dimensional charge-coupled device forming the light-sensitive element 25. The reference pulses and the transfer pulses are fed to the light-sensitive element 25. The light-sensitive element 25 begins transferring an electric signal which is formed by the photoelectric transfer in synchronization with the trailing edge of each reference pulse, and then transfers the electric signal in response to each transfer pulse. Therefore, an electric signal as shown in FIG. 6(c) is outputted from the light-sensitive element 25. The output signal of the light-sensitive element 25 is amplified by an amplifier 31 and is fed to a comparator 32. The comparator 32 compares the output signal of the amplifier 31 with the reference level $V_{REF}$ applied at a terminal 33 and provides a sample-hold circuit 34 with a smapling pulse as shown in FIG. 6(d). A saw tooth wave generator 35 receives the reference pulse shown in FIG. 6(a) which is derived from the clock generator 30, and generates a saw tooth wave shown in FIG. 6(e). The sample-hold circuit 34 samples and holds the saw tooth wave in the range from the level $-E$ to the level E in response to the sampling pulse from the comparator 32, and outputs an error voltage $V_{ER}$ shown in FIG. 6(f) at an output terminal 36. The level and pole of the error voltage $V_{ER}$ indicate the angle and the direction of the inclination, respectively. Then, the pickup 23 is attitude-controlled corresponding to the error voltage $V_{ER}$ by means of the attitude controlling servo system (not shown). In the above operation, when the disc 20 has no inclination, the front edge of the sampling pulse shown in FIG. 6(d) corresponds to an intersection P of a zero level of the saw tooth wave, as shown in FIG. 6(e). Therefore, the sample-hold circuit 34 outputs zero volt of the error voltage $V_{ER}$. Also, even when the disc 20 varies in the axial direction, the sample-hold circuit 34 outputs zero volt of the error voltage $V_{ER}$, because the incident light beam on the light-sensitive surface 25a merely moves in the direction of the arrow Y.

Figure 7:
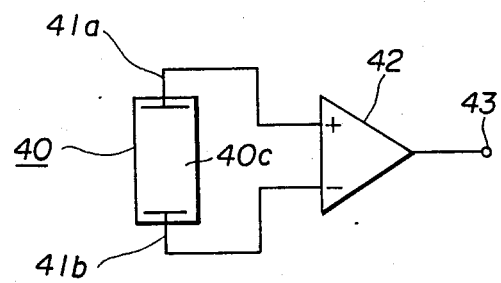
FIG. 7 is a circuit diagram of another signal processing circuit used in the present invention.

FIG. 7 shows a variation of the signal processing circuit shown in FIG. 5. One of the essential features of the variation is to replace the charge-coupled device of the light-sensitive element 25 with a semiconductor position-sensitive detector 40 for detection of one-dimensional positions. The position-sensitive detector, which is available in the market, is formed by a N-layer, I-layer and P-layer deposited in sequence on a plate-shaped silicon. Two electrodes 41a and 41b are deposited on an upper surface of the P-layer, or a light-sensitive surface 40c. The incident light on the position-sensitive detector 40 is photoelectrically converted, and a current corresponding to the incident light is divided into two current components, one of which is outputted at the electrode 41a and the other is outputted at the electrode 41b. A differential amplifier 42 outputs a difference voltage (error voltage) between the two input signals at an output terminal 43. The variation in FIG. 7 is simpler than the configuration in FIG. 5.

A description will now be given of a second embodiment of the present invention, by referring to FIGS. 8 through 12.

Figure 8:
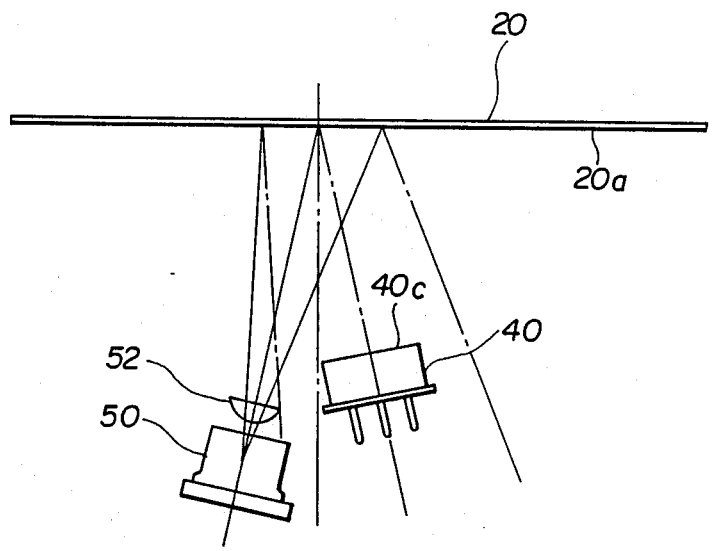

FIGS. 8 and 9 are respectively side and perspective views of an essential part of the second embodiment. A laser diode 50 emits a light beam with a substantially ellipse-shaped cross section 51. The longest diameter of the cross section 51 of the light beam is oriented in the radial direction of the disc 20 indicated by an arrow A2, whereas the shortest diameter thereof is oriented in the tangential direction of the disc 20 indicated by an arrow A1. A cyclindrical lens 52 is positioned in front of the laster diode 50. The cylindrical lens 52 has a configuration as shown in FIG. 10. A front surface of the cylindrical lens 52 which receives the light beam from the laser diode 50 is cylindrical, whereas a surface thereof opposing to the cylindrical surface is flat. The cylindrical lens 52 is an astigmatic lens.

FIGS. 11A and 11B show a function of the cylindrical lens 52. In FIG. 11A, there is illustrated a cross section of the cylindrical lens 52 in the radial direction A2, whereas in FIG. 11B there is illustrated a cross section of the cylindrical lens 52 in the tangential direction A1. The cross sectional part of the cylindrical lens 52 in the radial direction A2 focuses the light beam reflected by the disc 20 on the light-sensitive surface 40c of the position-sensitive detector 40, as shown in FIG. 11A, whereas the cross sectional part of the cylindrical lens 52 merely projects the light beam onto the light-sensitive surface 40c. In this regard, a toric lens may be used in place of the cylindrical lens 52. The cylindrical lens 52 is positioned so that its longitudinal direction corresponds with the tangential direction A1 of the disc 20. Therefore, the shortest diameter of the ellipse-shaped cross section 51 of the light beam corresponds with the longitudinal direction of the cylindrical lens 52. Therefore, as shown in FIG. 12, only part of the light beam emitted by the laser diode 50 which enters a substantially rectangular area 52a in the cross section of the cylindrical lens 52 can be propagated through the lens 52. Hence, the narrow and long beam spot 37 can be irradiated on the surface of the disc 50.

The light beam reflected by the disc 50 is received by the light-sensitive surface 40c of the position-sensitive detector 40, as shown in FIGS. 8 and 9. The light beam moves on the light-sensitive surface 40c in accordance to the inclination of the disc 20. Of course, the second embodiment satisfies the relationship discussed in the foregoing. Further, even when the disc 20 varies in the axial direction, the amplifier 42 outputs no voltage difference resulting from this displacement, because the light beam on the light-sensitive surface 40c moves only in the tangential direction of the arrow A1.

Figure 13:
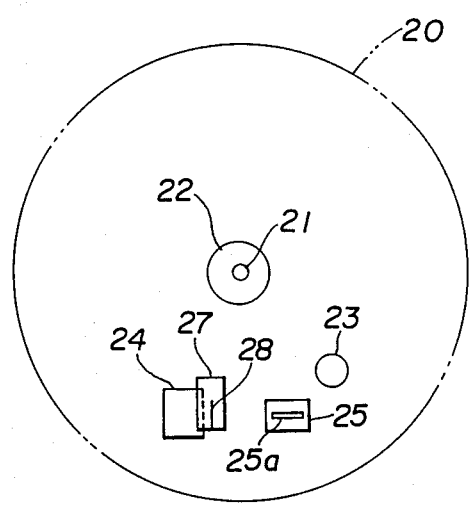
FIG. 13 is a plan view of an essential of a disc variation detecting apparatus of the present invention, which is designed so as to detect positional variations of a disc in an axial direction.

A description will be given of an example of a disc variation detecting apparatus designed to detect positional variations in the axial direction, by referring to FIG. 13.

Detection of positional variations of the disc in the axial direction can be achieved by modifying the structure shown in FIGS. 2A and 2B. In detail, as shown in FIG. 13, the slit 28 of the slit plate 27 used in the first embodiment is oriented in a direction perpendicular to the tangential direction of the disc 20, and correspondingly the light-sensitive element 25 is positioned in such a manner that the light-sensitive surface 25a thereof is oriented in the tangential direction of the disc 20. This configuration makes ti possible to detect the displacement of the disc in the axial direction without being affected by the inclination of the disc.

As pointed out in the foregoing, the displacement of the disc in the axial direction does not substantially affect the recording or reproducing operation. However, an additional control for the pickup is possible by using the configuration in FIG. 13. For example, an abnormal displacement of the disc suggests some troubles in the recording and/or reproducing apparatus.

The present invention is not limited to the embodiments, but various variations and modifications may be made without departing from the scope of the present invention.

What is claimed is:

1. A disc attitude variation detecting apparatus adapted to a recording and/or reproducing apparatus in which an information is recorded on or reproduced from an information recording disc by a laser beam emitted by a pickup, said pickup having an allowable attitude error that falls within a predetermined angle range, said disc attitude variation detecting apparatus comprising:
   light-emitting means for projecting a light beam on said disc;
   light-sensitive means for receiving said light beam reflected by said disc and outputting a corresponding electric signal, said light-sensitive means facing said disc and being positioned together with said light-emitting means in a tangential direction of tracks on said disc, said light beam forming a spot on said light-sensitive means, said spot being displaced depending on variations in an attitude of said disc and in an attitude of said pickup;
   light beam shaping means for shaping the light beam emitted by said light-emitting means so that a width of said spot along a displacement direction of said spot is equal to or less than an amount of displacement of said spot corresponding to said predetermined angle range of the allowable attitude error of said pickup, and
   signal processing means for detecting, on the basis of said electric signal, a positional displacement of said spot on said light-sensitive means, said positional displacement corresponding to variations in the attitude of said disc.

2. A disc attitude variation detecting apparatus as claimed in claim 1, wherein said light beam shaping means comprises a slit plate which is positioned betwene said light-emitting means and said disc, said slit plate having a long and narrow slit oriented in said tangential direction.

3. A disc attitude variation detecting apparatus as claimed in claim 2, wherein said light-sensitive means has an elongated shape and is positioned so that its longitudinal direction corresponds with a direction perpendicular to said tangential direction.

4. A disc attitude variation detecting apparatus as claimed in claim 1, wherein said light beam shaping means comprises a slit plate which is positioned between said light-emitting means and said disc, said slit plate having a long and narrow slit oriented in a direction perpendicular to said tangential direction.

5. A disc attitude variation detecting apparatus as claimed in claim 4, wherein said light-sensitive means has an elongated shape and is positioned so that its longitudinal direction corresponds with said tangential direction.

6. A disc attitude variation detecting apparatus as claimed in claim 1, wherein said signal processing means includes a comparator for comparing said electric signal with a reference signal, a saw tooth generator for generating a saw tooth signal, and a sample-hold circuit for sampling said saw tooth signal in response to a comparison result in said comparator and holding a sampled saw tooth signal, so that said sampled saw tooth signal is outputted as a signal indicating the variation in the attitude of said disc.

7. A disc attitude variation detecting apparatus as claimed in claim 1, wherein said light-emitting means is a light-emitting diode.

8. A disc attitude variation detecting apparatus as claimed in claim 1, wherein said light-sensitive means is a one-dimensional charge-coupled device which has an elongated shape and is positioned in the direction perpendicular to said tangential direction.

9. A disc attitude variation detecting apparatus as claimed in claim 1, wherein said light-sensitive means is a semiconductor position-sensitive detector for detecting one-dimensional positions.

10. A disc attitude variation detecting apparatus as claimed in claim 9, wherein said signal processing means is a differential amplifier for differential-amplifying output signals of said semiconductor position-sensitive detector, so that a difference signal is outputted by said detector as a signal indicating the variation in the attitude of said disc.

11. A disc attitude variation detecting apparatus as claimed in claim 1, wherein said light-emitting means is a laser diode.

12. A disc attitude variation detecting apparatus as claimed in claim 11, wherein said light beam shaping means comprises a lens for focusing said light beam emitted by said laser diode on said disc.

13. A disc attitude variation detecting apparatus as claimed in claim 12, wherein said lens is a cylindrical lens.

14. A disc attitude variation detecting apparatus as claimed in claim 12, wherein said lens is a toric lens.

* * * * *